United States Patent [19]

Haseloh et al.

[11] Patent Number: 5,098,033
[45] Date of Patent: Mar. 24, 1992

[54] GYROPLANE WITH TILTING MAST

[75] Inventors: Peter Haseloh, Edmonton; Daniel Haseloh, Beaumont, both of Canada

[73] Assignee: Rotary Air Force Inc., Canada

[21] Appl. No.: 463,362

[22] Filed: Jan. 11, 1990

[30] Foreign Application Priority Data

Jun. 28, 1989 [CA] Canada .................. 604276

[51] Int. Cl.$^5$ .................................................. B64C 27/52
[52] U.S. Cl. ......................................... 244/8; 244/17.27
[58] Field of Search ................ 244/17.11, 17.27, 8, 244/17.25, 54, 4 A; 416/147, 148, 500

[56] References Cited

U.S. PATENT DOCUMENTS

| | | | |
|---|---|---|---|
| 2,299,010 | 10/1942 | Doman | 416/500 |
| 2,486,059 | 10/1945 | Pentecost | 170/135.24 |
| 2,615,657 | 10/1952 | Young et al. | 244/17.27 |
| 2,755,016 | 7/1956 | Busch | 416/500 |
| 2,861,641 | 11/1958 | Bensen | 244/17.25 |
| 3,034,746 | 5/1962 | Temple | 244/17.11 |
| 3,261,543 | 7/1966 | Holgersson | 416/500 |
| 3,474,987 | 7/1967 | Meditz | 244/4 |
| 3,558,082 | 1/1968 | Bennie | 244/17.25 |
| 4,071,206 | 1/1978 | Magill | 244/17.11 |
| 4,301,981 | 11/1981 | Hartt | 244/12.2 |
| 4,473,199 | 11/1984 | Magill | 244/17.11 |
| 4,653,705 | 3/1987 | Bensen | 244/17.11 |

*Primary Examiner*—Galen Barefoot
*Attorney, Agent, or Firm*—Davis, Bujold & Streck

[57] ABSTRACT

An improvement in a gyroplane having a keel, a mast which extends from the keel, and a rotor blade which rotates at the top of the mast. The improvement consists of a forshortened mast extending substantially vertically from the keel. The mast has a first end secured to the keel and a second end. A mast extension is provided having a first end and a second end. The first end of the extension is pivotally secured to the second end of the mast. A rotor blade is mounted to the second end of the extension. A number of selection positions are provided permitting the pilot to fix the extension in a preselected angular position with respect to the mast, whereby the center of gravity of the gyroplane is altered to maintain flight attitude having regard to the weight of the pilot and cargo.

3 Claims, 6 Drawing Sheets

GYROPLANE WITH TILTING MAST

BACKGROUND OF THE INVENTION

The primary components of a gyroplane are; a keel, a mast which extends vertically from the keel at an angle, and a rotor blade which rotates at the top of the mast. During flight the keel of the gyroplane is suspended from the rotating rotor blade with a flight attitude of 11¼ degrees nose down. A change in the weight of the pilot or cargo changes the centre of gravity and consequently, the attitude of the gyroplane during flight. It is therefore necessary to adjust the centre of gravity of the gyroplane everytime there is a significant change in the weight of the pilot or cargo.

One way of adjusting the flight attitude is to suspend the gyroplane from it's mast with the pilot in the seat and the cargo in place. Weights are then attached to the keel to adjust the centre of gravity until the desired flight attitude is achieved. The disadvantage of attaching weights is that they may become detached during flight. A second way of adjusting the flight attitude is to reposition the mast in relation to the keel. The gyroplane is then suspended from it's mast with the pilot in the seat and the cargo in place to determine whether the adjustment has had the desired effect on the flight attitude of the gyroplane. Until the centre of gravity adjustment is simplified the gyroplane will be limited in its usefulness.

SUMMARY OF THE INVENTION

What is required is a gyroplane with a centre of gravity which can be altered to maintain the desired flight attitude having regard to the weight of the pilot and cargo.

According to the present invention there is provided an improvement in a gyroplane having a keel, a mast which extends from the keel, and a rotor blade which rotates at the top of the mast. The improvement is comprised of a foreshortened mast extending substantially vertically from the keel. The mast has a first end secured to the keel and a second end. A mast extension is provided having a first end and a second end. The first end of the extension is pivotally secured to the second end of the mast. The second end of the extension has means to mount a rotor blade. Means are provided to fix the extension in a preselected angular position with respect to the mast, whereby the centre of gravity of the gyroplane is altered to maintain flight attitude having regard to the weight of the pilot and cargo.

Although beneficial results may be obtained through the use of the invention described, it is preferable if some allowance is made for wind gusts which buffet the mast during flight. For example, in conventional gyroplane construction the mast is placed at an angle and flexes along its length in response to wind gusts. Even more beneficial results may therefore be obtained if the improvement has parallel plates at the first end of the extension such that the plates straddle the second end of the mast. Each of the plates has a hole and the holes in the plates are registered such that a bolt can be extended through the holes. The mast has an opening in which is housed a rubber bushing. A bolt is extended through the holes in the plates and through the rubber bushing to pivotally secure the extension to the mast. The rubber bushing permits flexing to occur during flight.

A plurality of selection positions are provided as each of the plates at the first end of the extension have a second hole. The holes in the plates are registered such that a bolt can be extended through the holes. The second end of the has a plurality of holes. By extending a bolt through the holes in the plates and a selected one of the holes in the mast, the extension is fixed in a preselected angular position with respect to the mast.

Although beneficial results may be obtained through the use of the invention described, drilling a plurality of holes in the mast in close proximity can potentially create a structural weakness. Therefore, the number of selection positions must be either limited or means must be devised for ensuring that all desired selection positions are provided without creating a structural weakness. Even more beneficial results may therefore be obtained if the mast has a second opening spaced from the first opening in which is disposed an insert having eccentrically positioned holes. By adjusting the positioning of the insert in the second opening the positioning of the holes may be altered to increase the number of selection positions.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
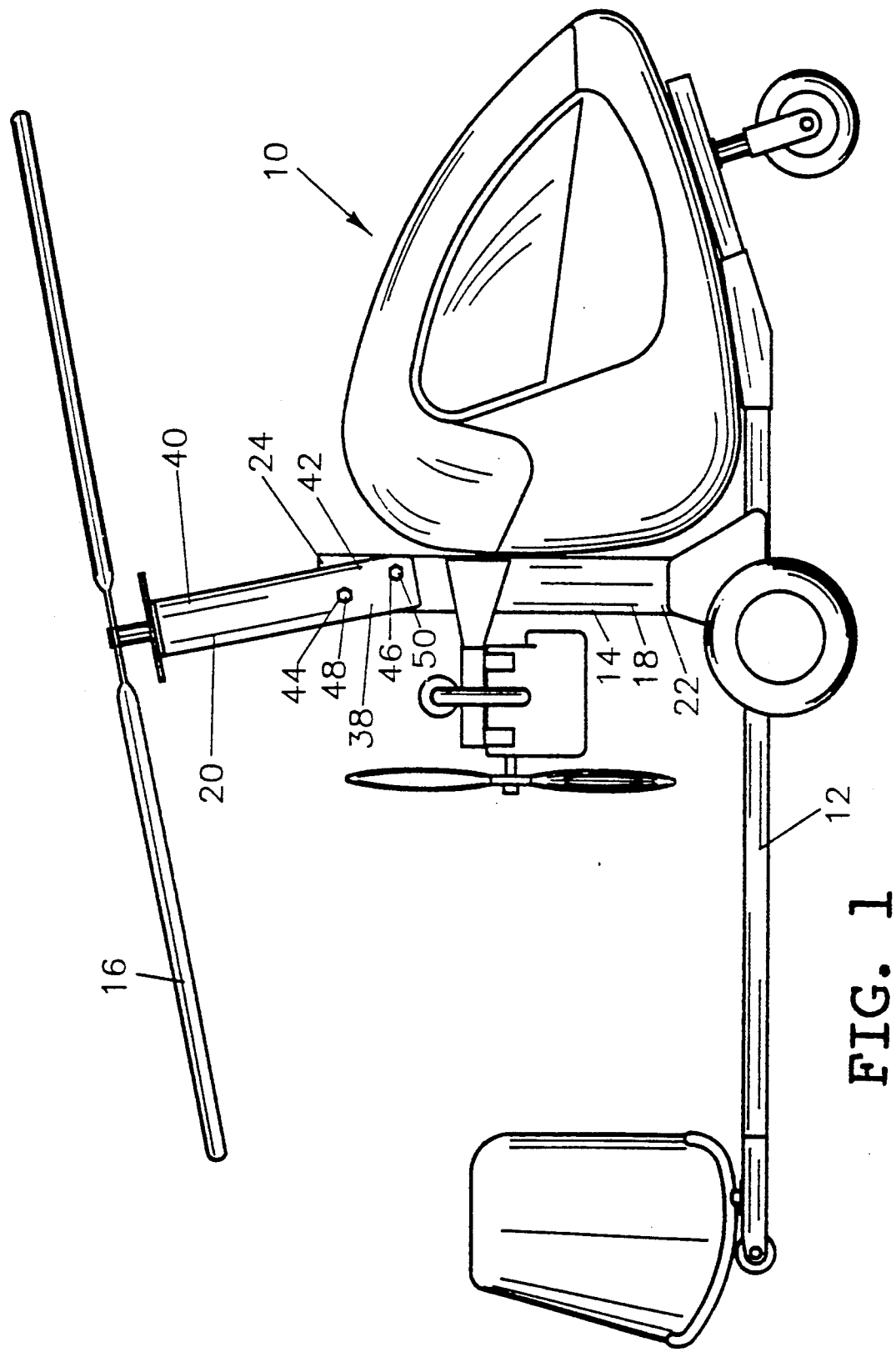
FIG. 1 is a side elevation view of a gyroplane in which is incorporated a preferred embodiment of the improvement.

The preferred embodiment will now be described with reference to FIGS. 1 through 8. The preferred embodiment is incorporated in a gyroplane, generally designated by reference numeral 10. The primary structural components of gyroplane 10 are a keel 12, a mast 14 which extends from keel 12, and a rotor blade 16 which rotates at the top of the mast 14. The improvement resides in the unique construction of mast 14. The other components of gyroplane 10 which do not form part of this invention will not be hereinafter described, as their construction and operation is well known to one skilled in the art.

Figure 2:
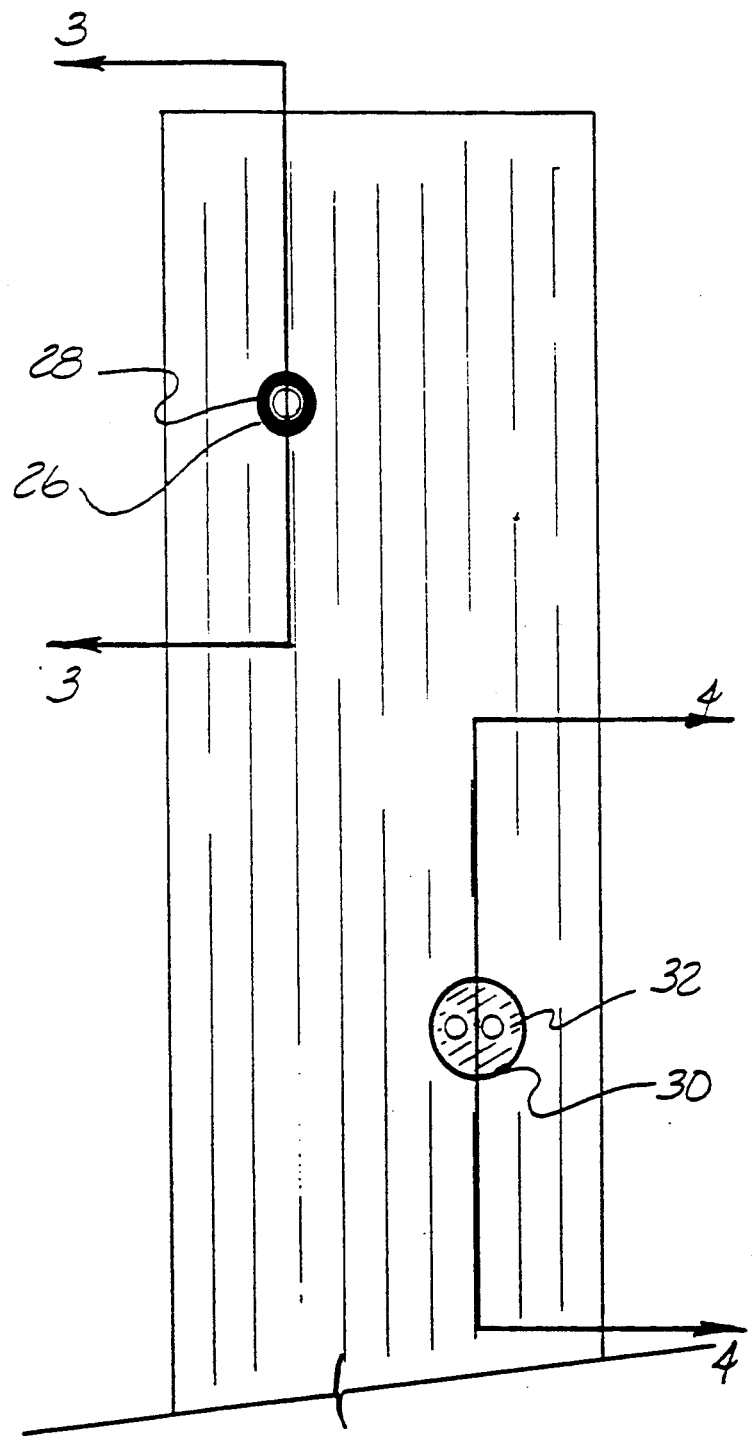
FIG. 2 is a detailed view of a portion of the improvement illustrated in FIG. 1.
Figure 3:
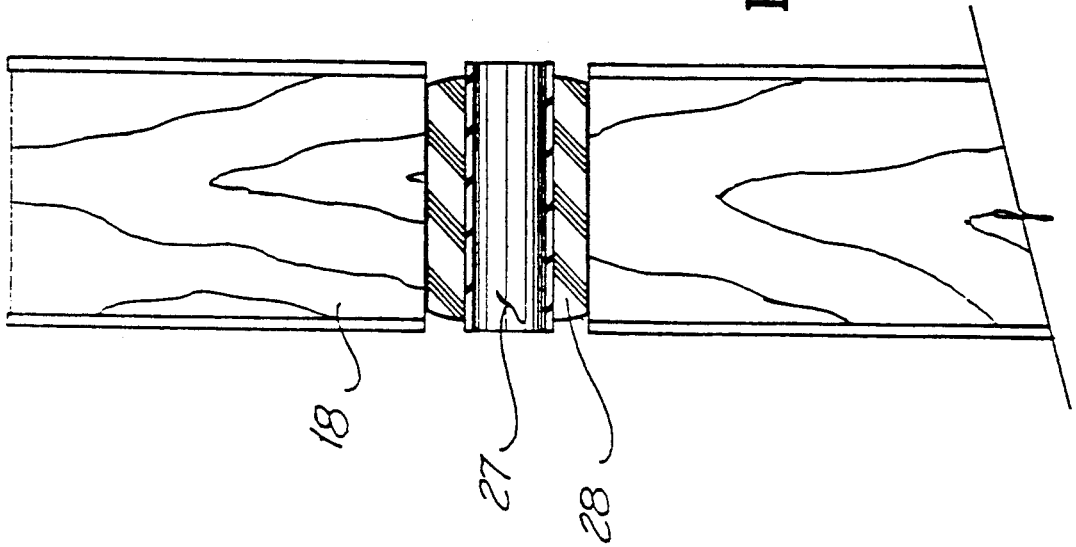
FIG. 3 is a section view taken along section lines 3—3 of FIG. 2.
Figure 4:
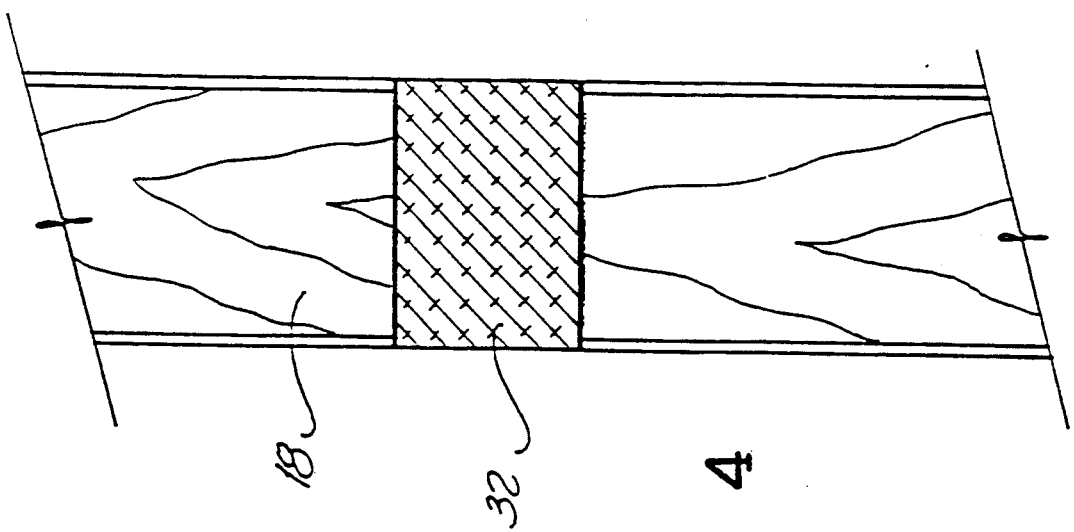
FIG. 4 is a section view taken along section lines 4—4 of FIG. 2.
Figures 5, 6:
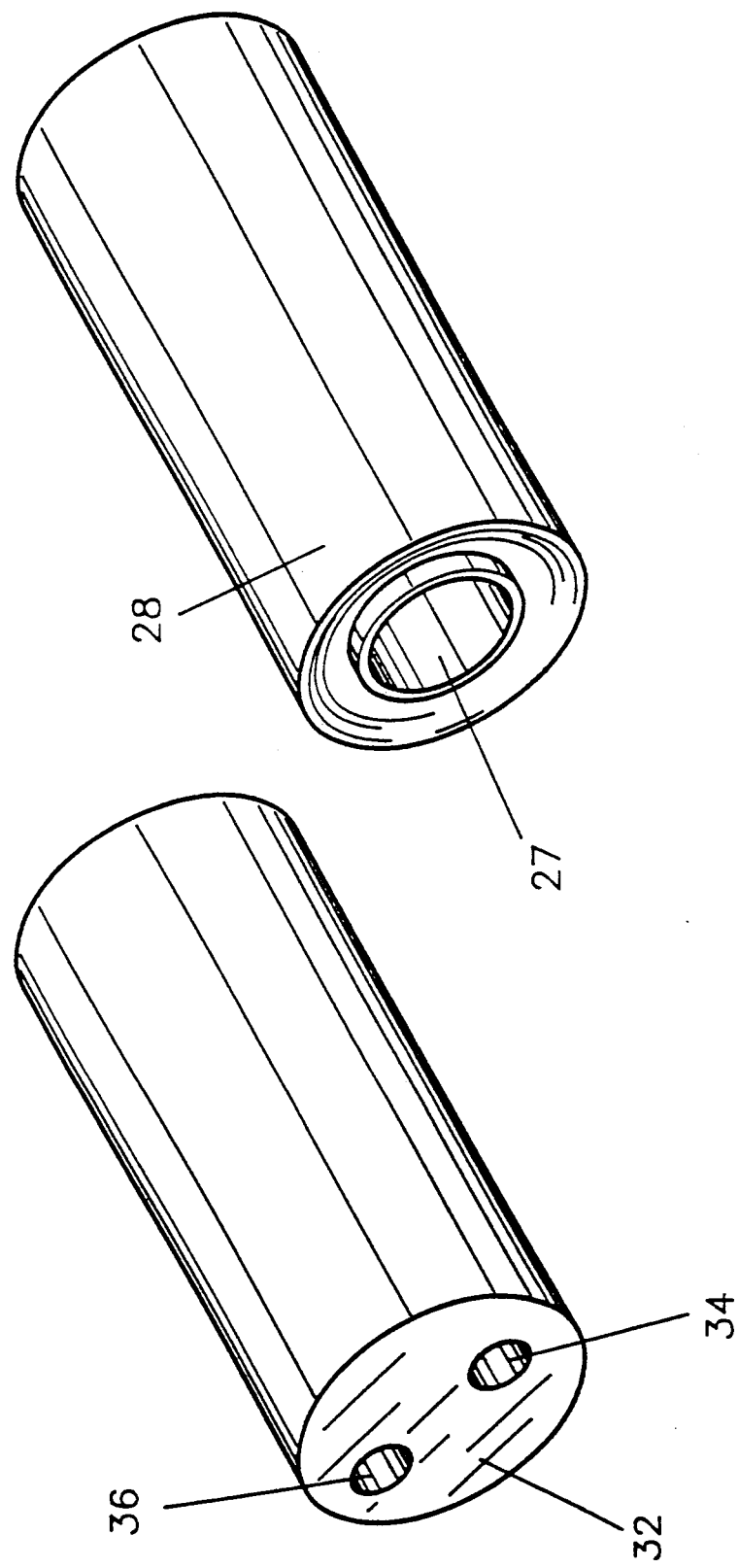
FIG. 5 is a perspective view of a bushing component.
FIG. 6 is a perspective view of an insert component.

Referring to FIG. 1, mast 14 consists of two sections, a foreshortened mast 18 and a mast extension 20. Foreshortened mast 18 extends substantially vertically from keel 12. Foreshortened mast 18 has a first end 22 secured to keel 12 and a second end 24. Referring to FIG. 2, foreshortened mast 18 has a first opening 26 adjacent second end 24. A rubber bushing 28 is housed in first opening 26, as is illustrated in FIG. 3. Referring to FIG. 5 rubber bushing 28 has a central hole 27. Referring to FIG. 2, foreshortened mast 18 has a second opening 30, spaced from first opening 26. A cylindrical insert 32 is disposed in second opening 30, as is illustrated in FIG.

Figure 7:
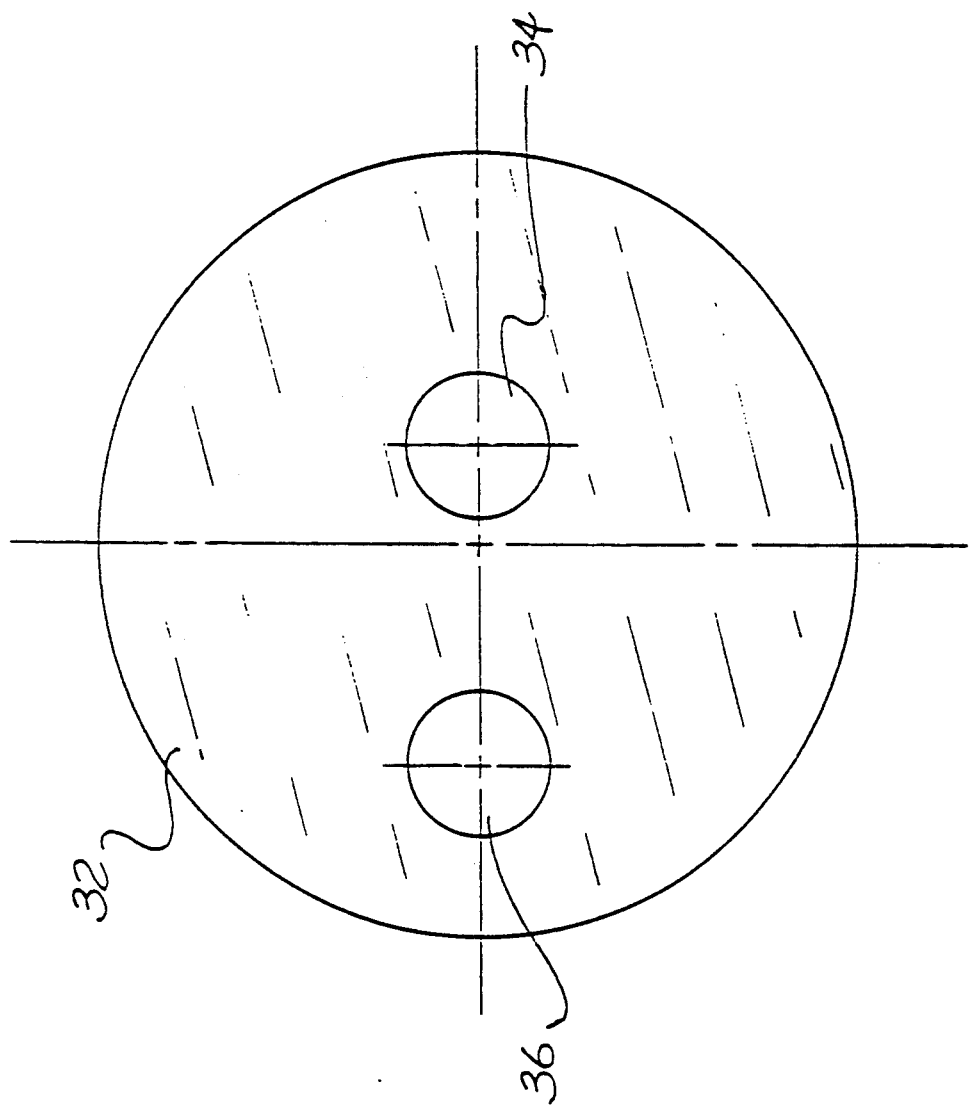
FIG. 7 is a front elevation view of an insert component.

4. Referring to FIGS. 6 and 7, cylindrical insert 32 has two eccentrically positioned holes 34 and 36. Mast extension 20 has a first end 38 and a second end 40. First end 38 has parallel plates 42 which straddle second end 24 of foreshortened mast 18. Each of plates 42 have a first hole 44, and a second hole 46. Holes 44 are registered such that a bolt 48 can be extended through them, and holes 46 are similarly registered such that a bolt 50 can be extended through them. Rotor blade 16 is rotatably mounted at second end 40 of extension 20.

The use and operation of foreshortened mast 18 and mast extension 20 will now be described with reference to FIGS. 1 through 8. In assembling mast 14, mast extension 20 is placed in position over foreshortened mast 18 with plates 42 straddling second end 24. Bolt 48 is then inserted through holes 44 in plates 42 and through hole 27 in rubber bushing 28. Bolt 48 pivotally secures extension 20 to foreshortened mast 18. Bolt 50 is then extended through holes 46 in plates 42 and through either hole 34 or 36 in insert 32 to fix extension 20 in a selected angular position with respect to foreshortened mast 18. When gyroplane 10 is in flight rubber bushing 28 permits flexing of mast 14 to occur in response to wind gusts.

Figure 8:
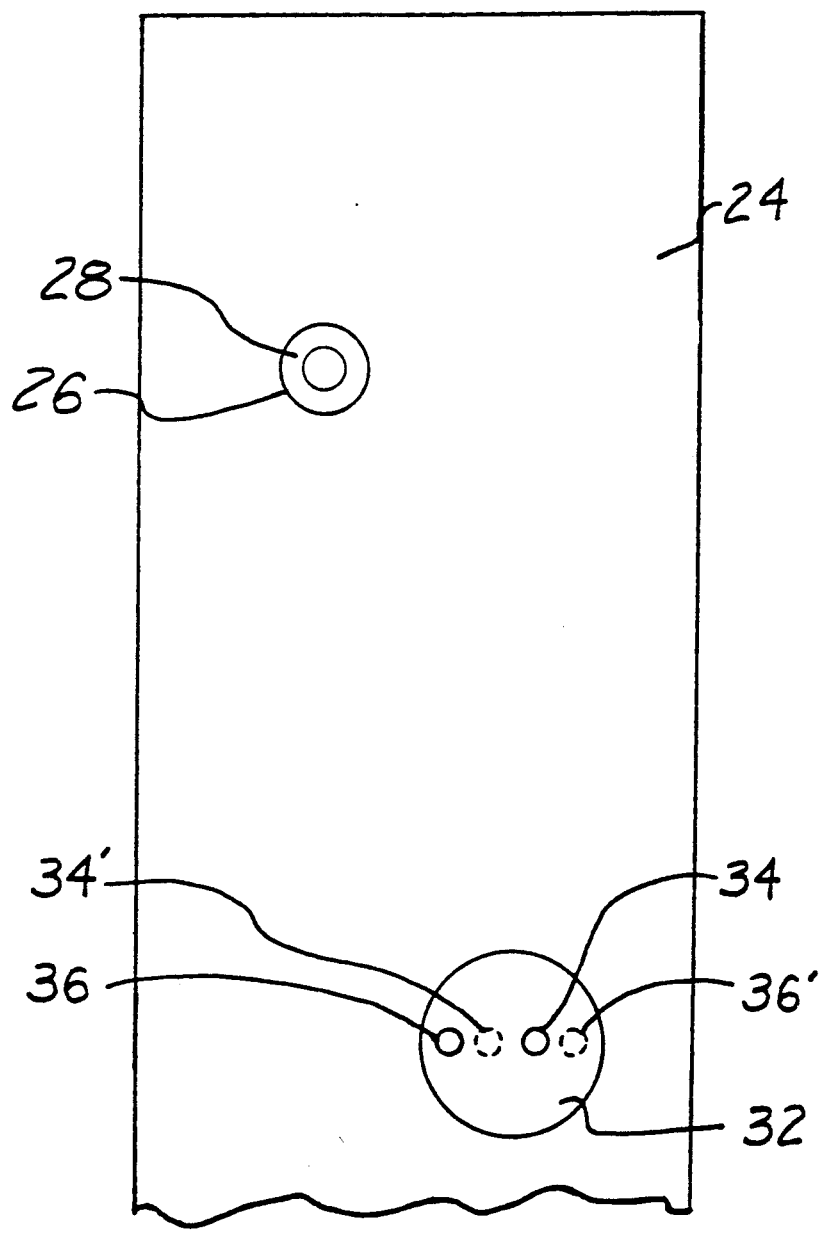
FIG. 8 is a diagrammatic representation of adjustment alternatives.

The advantage provided by the Applicant's mast construction using foreshortened mast 18 and mast extension 20 is the manner in which it is possible to adjust the centre of gravity of gyroplane 10 to maintain flight attitude having regard to the weight of the pilot and cargo. Referring to FIG. 8, there are four possible weight adjustments (hole 36' for 110-150 pounds, hole 34 for 150-190 pounds, hole 34' for 190-220 pounds, and hole 36 for 220 pounds and up, for example). When cylindrical insert 32 is in a first position (as shown in FIG. 8) there are two selection positions, as the pilot may select hole 34 or hole 36. By rotating cylindrical insert 32 in second opening 30 180 degrees the positioning of holes 34 and 38 (shown in ghost in FIG. 8) is altered increasing the number of selection positions from two to four.

It will be apparent to one skilled in the art that the permissible weight for each of the four positions possible with cylindrical insert 32 will vary depending upon the construction of gyroplane 10, and the positioning of first opening 26 and second opening 30. With the Applicant's machine the weight restrictions are set forth in FIG. 8. With each adjustment of the centre of gravity, the attack angle of rotor blade 16 must be checked. The mode of adjustment of the attack angle of rotor blade 16 will be apparent to one skilled in the art.

It will be apparent to one skilled in the art that with the present invention the centre of gravity of gyroplane 10 can be altered to maintain the desired flight attitude of 11¼ degrees nose down having regard to the weight of the pilot and cargo. It will also be apparent to one skilled in the art that modifications may be made to the preferred embodiment without departing from the spirit and scope of the present invention. For example, although the use of insert 32 is preferred, mast 14 can be made adjustable by merely having several holes 34 and 36 extending through second end 24 of foreshortened mast 18. Although it is preferred that insert 32 by cylindrical so that it may merely be rotated in opening 30, insert 32 can be made a different shape which would merely require insert 32 to be withdrawn and rotated prior to reinsertion. Although use with rubber bushing 28 is preferred, mast 14 would be operable, although not providing as safe or as smooth of a ride, without rubber bushing 28.

The embodiments of the invention in which an exclusive property or privilege is claimed are defined as follows:

1. An improvement in a gyroplane having a keel, a mast which extends from the keel, and a rotor blade which rotates at the top of the mast, the improvement comprising:

a. a foreshortened mast extending substantially vertically from the keel, the mast having a first end secured to the keel and a second end, the mast having an opening adjacent the second end in which is housed a rubber bushing, the mast having a plurality of holes spaced from the rubber bushing; and b. a mast extension having a first end and a second end, the first end of the extension having parallel plates such that the plates straddle the second end of the mast, each of the plates having a hole, the holes in the plates being registered such that a bolt can be extended through the holes in the plates and through the rubber bushing in the mast to pivotally secure the extension to the mast, with the rubber bushing permitting flexing to occur during flight, the second end of the extension having means to mount a rotor blade, each of the plates at the first end of the mast extension having a second hole, the holes in the plates being registered such that a bolt can be extended through the holes in the plates and a selected one of the holes in the mast to fix the extension in a preselected angular position with respect to the mast, whereby the centre of gravity of the gyroplane is altered to maintain flight attitude having regard to the weight of the pilot and cargo.

2. An improvement in a gyroplane having a keel, a mast which extends from the keel, and a rotor blade which rotates at the top of the mast, the improvement comprising:

a. a foreshortened mast extending substantially vertically from the keel, the mast having a first end secured to the keel and a second end, the mast having a first opening adjacent the second end in which is housed a rubber bushing, the mast having a second opening spaced from the first opening in which is disposed an insert having eccentrically positioned holes, such that by adjusting the positioning of the insert in the second opening the positioning of the holes may be altered to increase the number of selection positions; and b. a mast extension having a first end and a second end, the first end of the extension having parallel plates such that the plates straddle the second end of the mast, each of the plates having a first hole, the holes in the plates being registered such that a bolt can be extended through the holes in the plates and through the rubber bushing in the mast to pivotally secure the extension to the mast, with the rubber bushing permitting flexing to occur during flight, the second end of the extension having means to mount a rotor blade, each of the plates having a second hole, the holes in the plates being registered such that a bolt can be extended through the holes in the plates and one of the holes in the insert in the mast to fix the extension in a preselected angular position with respect to the mast, whereby the centre of gravity of the gyroplane is altered to maintain flight attitude having regard to the weight of the pilot and cargo.

3. An improvement in a gyroplane having a keel, a mast which extends from the keel, and a rotor blade which rotates at the top of the mast, the improvement comprising:

a. a foreshortened mast extending substantially vertically from the keel, the mast having a first end secured to the keel and a second end, the mast having a first opening adjacent the second end in which is housed a rubber bushing, the mast having a second opening, spaced from the first opening, in which is disposed an cylindrical insert having two eccentrically positioned holes, such that by rotating the insert in the second opening the positioning of the holes may be altered to increase the number of selection positions from two to four; and b. a mast extension having a first end and a second end, the first end of the extension having parallel plates such that the plates straddle the second end of the mast, each of the plates having a first hole, the holes in the plates being registered such that a bolt can be extended through the holes in the plates and through the rubber bushing in the mast to pivotally secure the extension to the mast, with the rubber bushing permitting flexing to occur during flight, the second end of the extension having means to mount a rotor blade, each of the plates having a second hole, the holes in the plates being registered such that a bolt can be extended through the holes in the plates and one of the holes in the insert in the mast to fix the extension in a preselected angular position with respect to the mast, whereby the centre of gravity of the gyroplane is altered to maintain flight attitude having regard to the weight of the pilot and cargo.

* * * * *